(12) United States Patent
Selgi et al.

(10) Patent No.: US 7,782,637 B2
(45) Date of Patent: Aug. 24, 2010

(54) SWITCHED-MODE ELECTRONIC POWER DEVICE

(75) Inventors: Lorenzo Maurizio Selgi, Fiumefreddo di Sicilia (IT); Leonardo Fragapane, Catania (IT); Luigi Arcuri, Misterbianco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 557 days.

(21) Appl. No.: 11/758,529

(22) Filed: Jun. 5, 2007

(65) Prior Publication Data
US 2008/0002446 A1    Jan. 3, 2008

(30) Foreign Application Priority Data
Jun. 5, 2006    (EP) ................................ 06425378

(51) Int. Cl.
*H02M 7/10*    (2006.01)
*H02M 1/00*    (2006.01)

(52) U.S. Cl. .................... 363/49; 363/147; 323/901; 257/368

(58) Field of Classification Search .................. 363/49, 363/55, 56.01, 56.09, 56.11; 323/901; 257/368
See application file for complete search history.

(56) References Cited

U.S. PATENT DOCUMENTS

| 5,313,381 | A | 5/1994 | Balakrishnan |
| 5,815,383 | A * | 9/1998 | Lei ............................. 363/49 |
| 6,259,618 | B1 | 7/2001 | Liaw et al. |
| 6,888,203 | B2 * | 5/2005 | Liaw et al. .................. 257/401 |
| 2004/0145924 | A1 | 7/2004 | Jang et al. |

* cited by examiner

*Primary Examiner*—Jessica Han
(74) *Attorney, Agent, or Firm*—Lisa K. Jorgenson; Robert Iannucci; Seed IP Law Group PLLC

(57) ABSTRACT

An electronic power device for controlling a load includes: a high-voltage integrated switch having an output terminal to be connected to the load; an integrated, and low-voltage driving circuit for driving the switch, and a start-up integrated circuit comprising a high-voltage resistor and such that it can be enabled, during a step of turning on the power device, in order to activate the driving circuit. The switch and the start-up circuit are integrated in a first semiconductor chip and the driving circuit is integrated in a different, second semiconductor chip.

29 Claims, 5 Drawing Sheets

SWITCHED-MODE ELECTRONIC POWER DEVICE

BACKGROUND

1. Technical Field

The present invention relates to switched-mode electronic power devices, in which integrated circuits are used for driving high-voltage switches and in which a start-up circuit is also required to be used.

2. Description of the Related Art

Among the electronic power devices for switched-mode applications, there are also Switched Mode Power Supplies (SMPS).

To the purpose, the U.S. Pat. No. 5,313,381 describes, with reference to the prior art, an SMPS power supply comprising a rectifier and an input filter connected to a primary of a transformer. The secondary of this transformer is connected to a rectifier and an output filter being provided with terminals in order to supply a load with a direct voltage.

The primary of the transformer is connected to a MOSFET (Metal Oxide Semiconductor Field Effect Transistor) switch that is intended to be driven by a PWM (Pulse Width Modulation) controller.

In an initial step, i.e., during the step of starting up the power supply, the PWM is caused to operate by a start-up network, which can be deactivated after the start-up has been carried out, based on the particular type of application.

A suitable performance/cost ratio is particularly difficult to achieve when manufacturing these switched-mode devices. This is mainly due to the fact that these devices have high-voltage components, such as the switching MOSFET and several components of the start-up network, and components that can be low-voltage (typically the PWM controller).

The self-contained integration of high-voltage components with low-voltage ones has some problems, which are not easily conciliated with the requirement of reducing the manufacturing cost by minimizing the number of electronic components external to the chip. The solutions to this problem that have been provided so far prove to be unsatisfactory.

BRIEF SUMMARY

One embodiment is a switched-mode electronic power device alternative to those of the prior art, and which overcomes the above-mentioned drawbacks of the conventional devices.

BRIEF DESCRIPTION OF THE SEVERAL VIEWS OF THE DRAWINGS

The advantages and further characteristics of the present invention will appear more clearly from the present description of preferred embodiments thereof, which is given as a non-limiting example, with reference to the annexed figures, in which.

DETAILED DESCRIPTION

Figure 1:
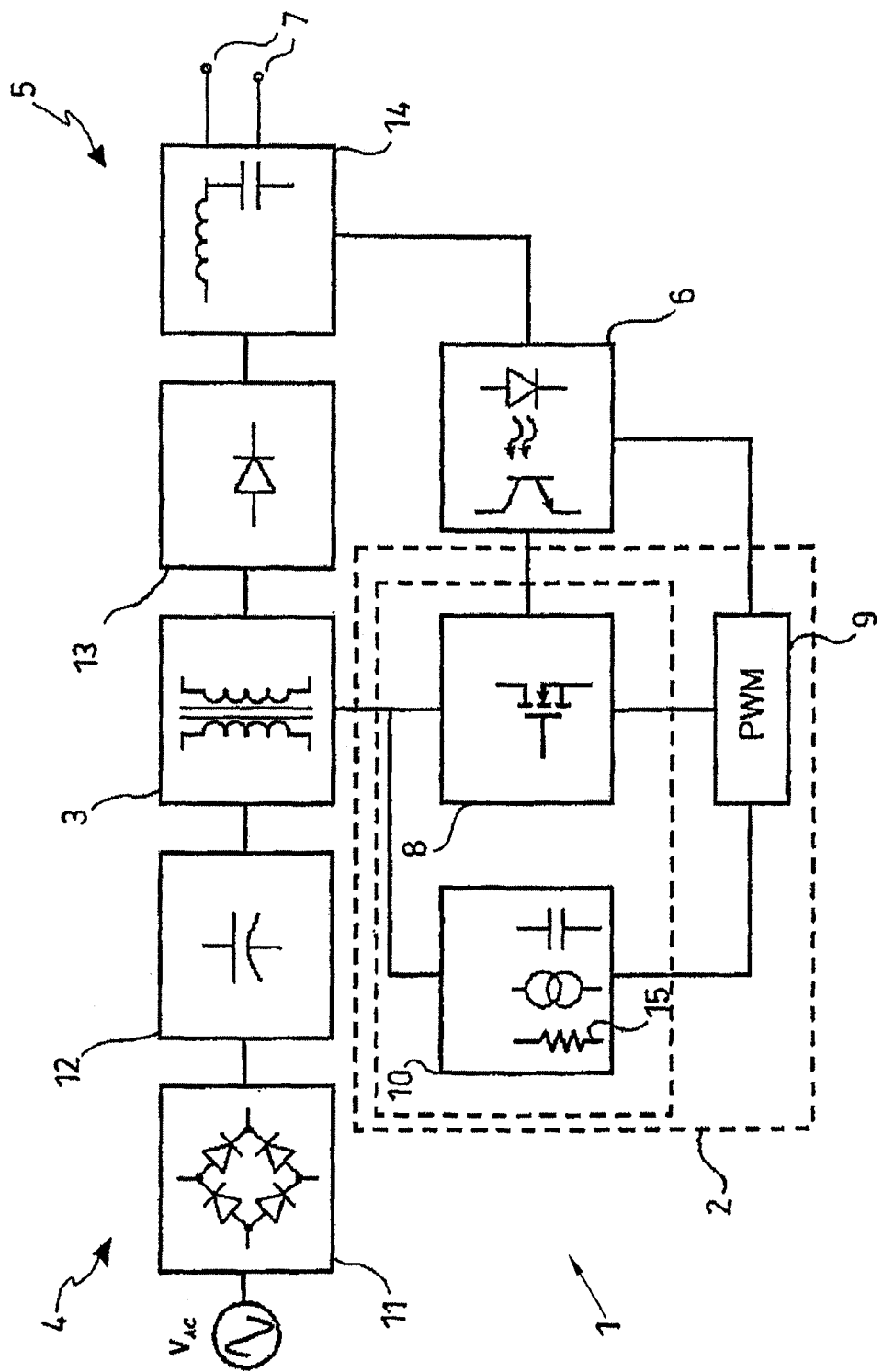
FIG. 1 is a block diagram of a power supply apparatus comprising a switched-mode electronic power device, according to an embodiment of the present invention.

FIG. 1 shows an apparatus 1 provided according to a first embodiment of the present invention. The apparatus 1 is a switched-mode power supply (SMPS). As will be also set fort herein below, the present invention can also be applied to apparatuses other than the switched-mode power supply described in this particular embodiment.

The power supply 1 comprises a switched-mode electronic power supply 2, which controls an isolation transformer 3 interposed between an input circuit 4 (which is supplied by an alternated voltage generator $V_{AC}$) and an output circuit 5 provided with terminals 7 for connection to an external load (not shown). The output circuit 5 is connected to the power device 2 by means of a feedback block 6.

The electronic power device 2 comprises a high-voltage switch 8, such as a change-over switch or power switch that can be provided, preferably, by an N-channel MOSFET transistor. The MOSFET transistor 8 (called the PMOS power switch 8 herein below) has a terminal connected to the transformer 3.

The electronic power device 2 is further provided with a low-voltage block 9 for driving the PMOS power switch 8, such as a PWM (Pulse Width Modulation) modulator that can be preferably provided by means of a miniaturized controller.

A turn-on or start-up circuit 10 is also included in the electronic power device 2, which can be made by conventional techniques, and such as to be enabled to operation during a start-up step of the device 2 and apparatus 1, and is then disabled during the normal "work" of the device 2. During the start-up step, the start-up circuit 10 activates the PWM driving block 9, which, in turn, activates the PMOS power switch 8.

The start-up circuit 10 is provided with a high-voltage resistor 15 that is intended to be connected to the PWM driving block 9 which, on the other hand, operates under low voltage. Advantageously, this resistor 15 has such a resistance—100 kOhm to 100 MegaOhm, according to what is required by the particular PWM driving block 9—which is sufficiently high to cause a potential drop at the ends thereof, due to which the driving block is not subjected to the high voltages at which the start-up circuit 10 operates, and which may damage it.

The input circuit 4 comprises a rectifier 11, such as a diode bridge connected to an input filter 12, which includes, particularly, a smoothing capacitor. The input filter 12 is connected to a first winding of the transformer 3, the second winding thereof being connected to the output circuit 5.

The output circuit 5 comprises an output rectifier 13 (such as a rectifier diode) connected to an output filter 14. The feedback block 6 comprises, preferably, a conventional optical insulator which couples the output filter 14 to the PWM driving block 9 such as to avoid a direct electrical contact.

With reference to the modes of fabricating the electronic power device 2, this can be manufactured by means of conventional integration techniques, such as preferably silicon integration techniques, and particularly, using the PMOS technology for the start-up circuit 10 and the power switch 8 and Bi-CMOS (Bipolar Complementary MOS) for the PWM driving block 9.

Figure 2:
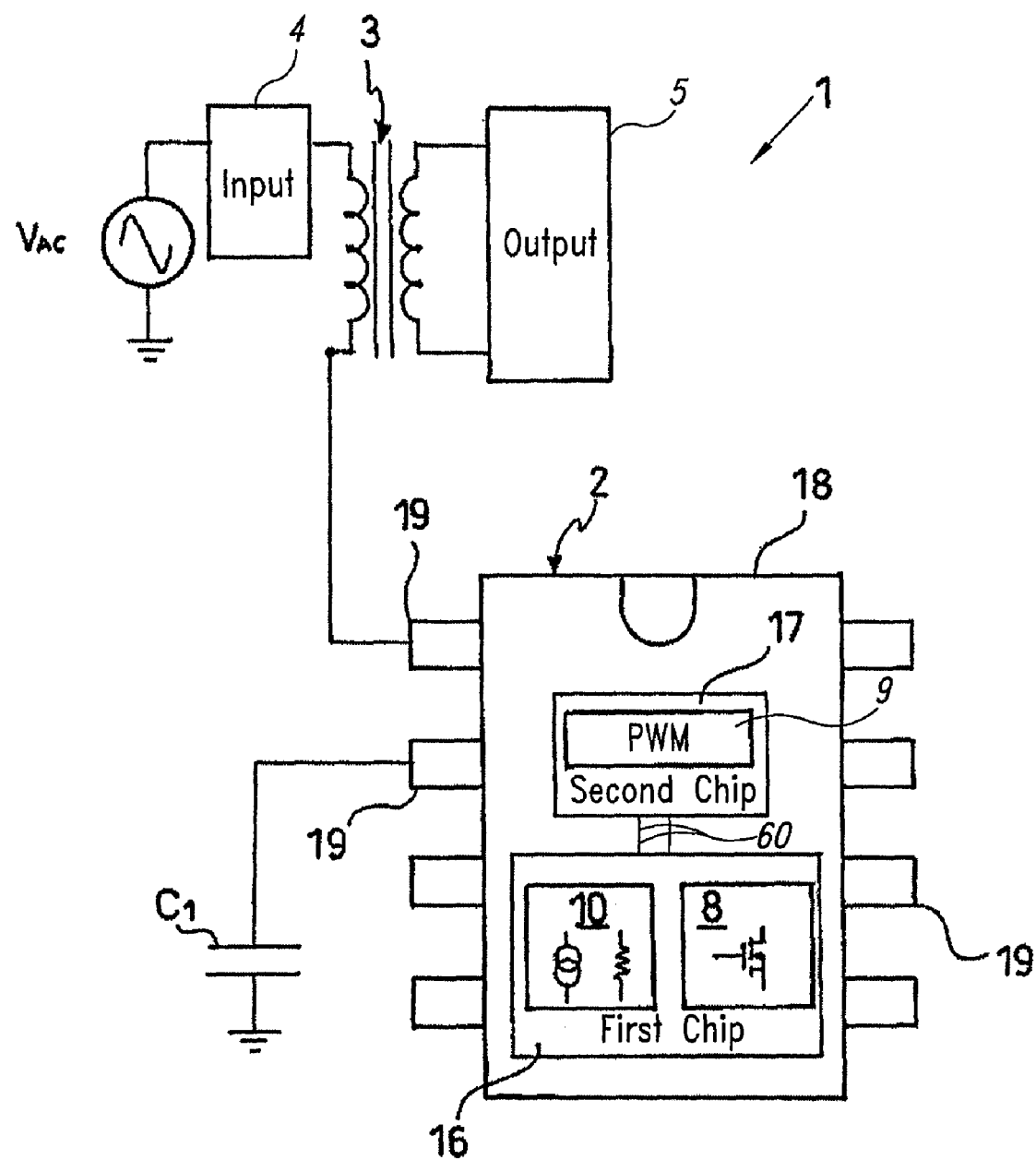
FIG. 2 schematically shows said apparatus in which the switched mode power device comprises first and second chips housed in an individual package.

As can be seen in FIG. 2, it is noted that the components of the electronic power device 2 are not provided on a same semiconductor chip, or, briefly, chip. In the annexed figures, identical numerals have been used for designating similar or identical apparatuses, devices, and components.

In greater detail, the start-up circuit 10 (comprising the high-voltage resistor 15) and the PMOS power switch 8 are integrated in a same chip 16, and the PWM driving block 9 is integrated in a different and separated second chip 17, and is connected to the first chip 16 by means of conductive wires (60), suitably extending between the two chips.

For example, the first chip 16 and second chip 17 are housed in a same enclosure or package 18 that can be made with conventional materials and techniques. The first chip 16 and the second chip 17 are fixed to two electrically-isolated conductive bases of package 18 (such as made of a resin known to those skilled in the art) which is provided with feet 19 for connection to external circuit elements, such as the circuit blocks of apparatus 1.

The electronic device 2 is thus "hybrid", because it includes both high-voltage components (the first chip 16 is a "power" circuit) and low-voltage components (the second chip 17 is a "signal" circuit), even though these are integrated in different semiconductor chip.

The term "high-voltage" and "low-voltage" are known to those skilled in the art to differentiate two devices based on the typology to which they belong. Particularly, these terms can also relate to the type of application, i.e., power applications (high-voltage) and signal application (low-voltage) and not only to the difference between the operative voltages of the compared devices.

For the application indicated above, the first chip 16 operates, for example, from 300 V to 1700 V, whereas the second chip 17 operates, for example, at voltages lower than 100 V.

In FIG. 2 a capacitor C1 external to the electronic device 2 is shown, which acts as a power supply for the PWM driving block 9 and is also connected to the start-up circuit 10 and to an auxiliary winding of the transformer 3 (not shown in the figure).

Figure 3:
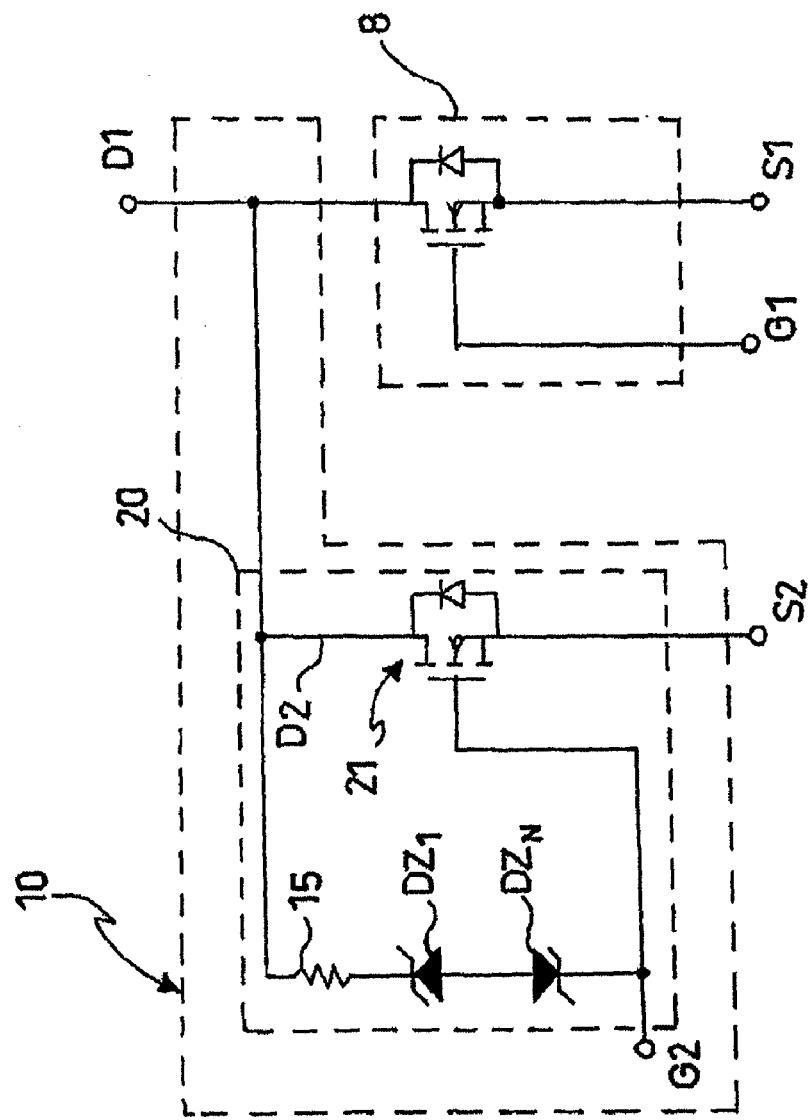
FIG. 3 shows an example of an electrical diagram equivalent to a start-up block and a changeover switch to be employed in said device.

FIG. 3 shows the equivalent electrical diagram of a particular embodiment of the start-up circuit 10 and PMOS power switch 8 to be integrated in the first chip 16.

The PMOS power switch 8 (represented with the symbol that also shows the inherent recirculation diode) has a first drain terminal D1 to be connected to the primary winding of the transformer 3, a first gate terminal G1, a first source terminal S1, both to be connected to respective terminals of the PWM driving block 9.

The start-up circuit 10 comprises a switching circuit 20 having the function of allowing the start-up circuit to adopt an active configuration, during the step of starting up the power supply 1, in order to take a turn-on electrical signal to be supplied to the capacitor C1 thereby allowing the operation of the PWM driving block 9, which in turn can drive the PMOS power switch 8 and, subsequently, adopt a passive configuration in which the capacitor C1 is not supplied, which is, on the other hand, loaded by the auxiliary winding of the transformer.

This switching circuit 20 includes the high-voltage resistor 15, a further PMOS power switch 21 and a threshold circuit that is made, for example, with a Zener diode chain DZ1 and DZN in a back-to-back configuration (a pair of which is depicted). The further power switch 21 is provided with a second drain terminal D2 common to the first drain terminal D1, a second gate terminal G2 and a second source terminal S2.

In the diagram in FIG. 3, the high-voltage resistor 15 is interposed between a cathode of a Zener diode DZ1 and the drain terminals D1 and D2 of the PMOS power switches 8 and 21. The second gate terminal G2 and the second source terminal S2 are intended to be connected to corresponding terminals of the PWM driving block 9.

With reference to the operative modes of the SMPS power supply 1, despite they are well known to those skilled in the art, a description of the operation of the same will be given herein below, for completeness of description.

In an initial step, the alternated-voltage generator $V_{AC}$ supplies the rectifier 11 and the input filter 12. The thus-obtained rectified current supplies the primary winding of the transformer 3. If the PMOS power switch 8 is open, the current does not flow within the primary winding of the primary winding of the transformer 3, and thus the PWM driving block 9 connected thereto is not supplied and is not activated.

The start-up circuit 10 connected to the primary winding of the transformer 3 turns to the active state when the voltage of this primary winding exceeds the block voltage of the diode chain DZ1 and DZN. When this voltage has been exceeded, the diode chain DZ1 and DZN is in the conduction state thereby causing the current to flow in the high-voltage resistor 15. As soon as the voltage of the second gate terminal G2 exceeds the threshold voltage of the further PMOS power switch 21, the latter turns to a closed state (i.e., in conduction). During this step, the further PMOS power switch 21 acts as a current generator, by loading the external capacitor C1, which acts as the power supply for the PWM driving block 9.

The PWM driving block 9 is thus operated and drives the PMOS power switch 8, which switches according to a trend fixed by the PWM block 9, and, i.e., based on a width-modulated train of pulses. The high-voltage resistor 15 avoids that the PWM driving block 9 is subjected to high voltage values, which are, on the other hand, applied to the PMOS 21 and PMOS 8 switches.

Accordingly, the current affecting the primary winding of the transformer 3, modulated by the PMOS power switch 8, generates a corresponding alternated signal on the output circuit 5. The output rectifier 13 and the output filter 14 provide the terminals 7 and thus the external load with a direct voltage of a suitable level.

The feedback block 6 takes a feedback signal from the output filter 14, which is supplied to the PWM driving block 9. The charge of the supply capacitor C1 causes the PWM driving block 9 to provide the start-up circuit 10 (for example, at the second gate terminal G2) with a voltage that causes the further power switch 21 to shift to an open state (i.e., not in conduction). In this configuration, and during the entire "work" step of the power supply following the start-up initial step, the start-up circuit 10 is deactivated (the PMOS 21 is open), and the power switch PMOS 8 is switched under the control of only the PWM driving block 9. The consumption under normal running conditions of the electronic device 2 is conveniently small when a high-voltage resistor 15 is selected which has a sufficiently high resistance.

Figure 4:
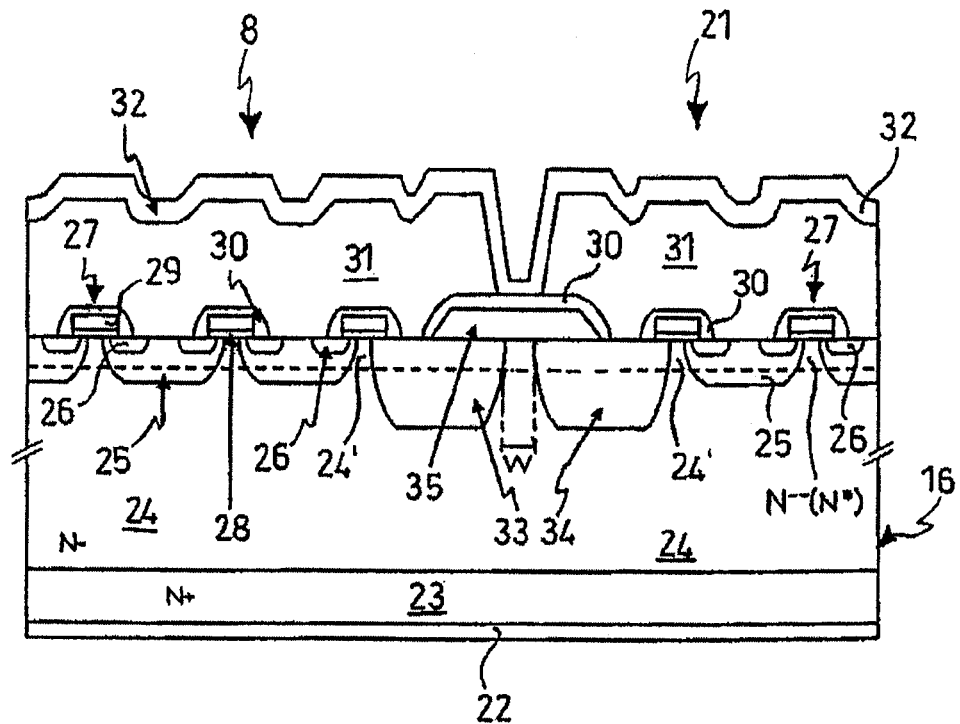
FIGS. 4 and 5 show two different exemplary embodiments of integrated MOSFET transistors to be employed in said device.

In FIG. 4 a portion of the first chip 16 is shown, in which the PMOS power switch 8 and the further PMOS power switch 21 are integrated. The two PMOS switches in FIG. 4 are identical to each other and can be provided by means of conventional silicon integration techniques, which typically provide using photolithographic steps, deposition steps, implant and diffusion steps for forming differently doped silicon layers, polycrystalline silicon layers, silicon dioxide layers and metallization layers.

The PMOS 8 and PMOS 21 power switches are vertical, as is usual with power MOSes, and comprise an epitaxially grown drain metallization layer 22, ($N^+$-type) substrate 23, ($N^-$-type) lower drain layer 24, and ($N^-$-type) upper layer.

In the drain layers 24 and 24', body (P) regions 25 develop, with ($N^+$-type) active source regions 26 being therein. Gate structures 27 suitably extend above the source regions 26 of each switch and comprise a gate oxide layer (silicon dioxide) 28, a doped polysilicon conductive layer 29, and a dielectric layer 30 made, for example, of BPSG glass (boron-phosphorus-silicon glass), respectively. Furthermore, the two PMOSs 8 and 21 include a relative metallization layer 31 on which there extends a passivation layer, such as made of silicon dioxide 32.

It should be observed that, because of the PWM driving, the source region 26 of the further power switch PMOS 21 (second source terminal S2 in FIG. 3) is at a higher voltage than the source region 26 of the PMOS power switch 8 (first source terminal S1). Advantageously, in the example in FIG. 4, an isolation has been ensured between the two areas of the chip 16, by providing two ($P^-$-type) wells 33 and 34, which are suitably spaced apart from each other. These $P^-$-type wells (which are isolated on the surface thereof by a silicon dioxide layer 35) ensure the desired isolation between the two PMOSs, without impairing the breakdown (i.e., the breakdown voltage) of the whole device.

With reference to the two PMOS switches 8 and 21 in FIG. 4, the following consideration relating to preferred embodiments are also useful.

The $N^-$-type lower drain layer 24 is dimensioned, in terms of thickness and doping, based to the breakdown voltage of the device 2. For example, the thickness of this layer 24 can range between 20 μm and 200 μm and its resistivity can range between Ohm·cm and 100 Ohm·cm. In a 800 V device, for example, the thickness of the lower drain layer 24 can be selected as to be about 70 μm and with a resistivity of 25 Ohm·cm.

The $N^-$-type upper drain layer 24' has a lower concentration than the $N^-$-type main layer and is advantageously selected such that its resistivity ensures the desired value of isolation voltage between the PMOS power switch 8 and the further PMOS power switch 21 (when a distance W has been set between the two $P^-$-type wells 33 and 34). On the other hand, the thickness of the upper drain layer 24' is connected to the geometrical characteristics of the active cell and can be compared to the depth of the body 25.

Figure 5:
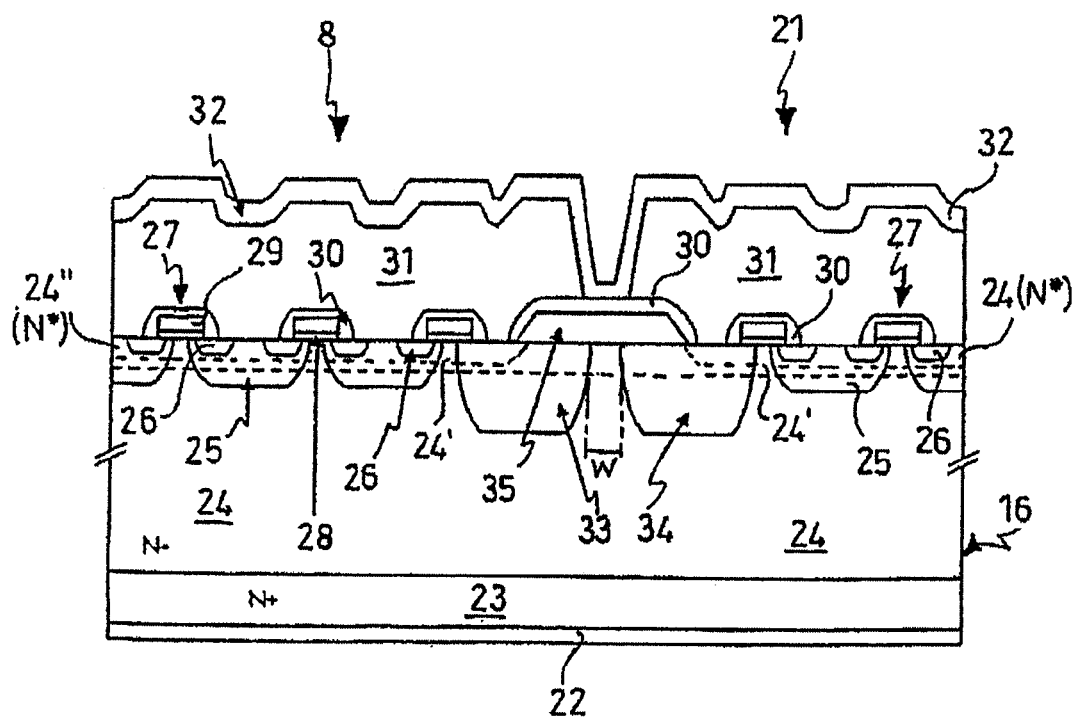

According to a first version, as shown in FIG. 5, and alternative to that in FIG. 4, the upper drain layer 24' is $N^-$-doped in the isolation regions 33 and 34 and has a layer 24'' augmented with N* doping, both on the surface thereof and in the active regions of the two PMOSs (such that the layer 24'' has a lower resistivity than the layer 24'). This augmented state 24'' (that can be obtained by means of a surface implant) is advantageous in that it avoids an undesired increase in the JFET (Junction Field Effect Transistor) component in Ron conduction, which is due to the use of $N^-$ doping for the epitaxial layer 24'.

For example, starting from a design value for the 30 Volt isolation voltage, and when a distance W has been set between the 15 μm $P^-$ wells 33 and 34, the resistivity of the layer 24' will be 50 Ohm·cm.

Furthermore, the isolation wells 33 and 34 can be advantageously made with one of the P-type implants that are available during the various process steps, such as the ring, body and deep body implant.

It should be noted that, according to a second embodiment alternative to that described above, the two PMOSs 8 and 21 in FIG. 4 can be also provided without the $N^-$-type upper layer 24'. In this case, the two P isolation wells 33 and 34 are spaced apart by a value W selected based on the $N^-$ doping of the individual drain layer 24, and for example, ranging between a minimum value of 5 μm and a maximum value of 100 μm. For example, with a 800 V device, as the resistivity of the drain layer 24 is of 25 Ohm·cm, W can be selected such as to be about 25 ~m, in order to ensure 30 V isolation.

In accordance with a third embodiment alternative to the preceding ones, in the structure in FIG. 4, the upper drain layer 24' is augmented with $N^+$ doping and thus has a lower resistivity than $N^-$ of the lower drain layer 24 and which extends, as shown in FIG. 4, both in the active and isolating regions. This augmented layer 24' can have, for example, a thickness of 2 μm, and can be epitaxially obtained and/or with an implant and diffusion of the same. In this case, the concentration increase is conveniently balanced by changing the distance W between the P-type wells 33 and 34.

Figure 6:
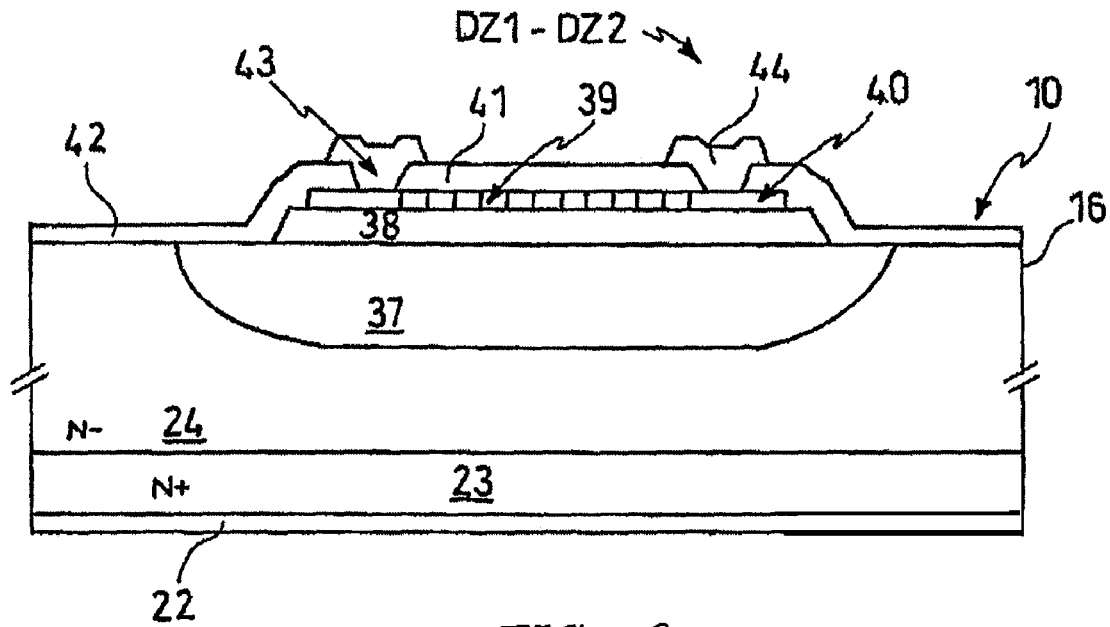
FIG. 6 shows an example of integrated diode chain in a back-to-back configuration to be employed in said start-up block.

In FIG. 6 another portion of the second chip 16 is shown, in which the Zener diode chain is integrated in a back-to-back configuration DZ1-DZN. This diode chain is obtained by means of PMOS technology and comprises the metallization layer 22 on which the ($N^+$-type) substrate 23 and the ($N^-$type) 24 substrate are arranged.

A $P^-$-type well 37 extending in the lower drain layer 24 is a drift region and has a beneficial effect on the breakdown voltage. This well 37 can be obtained during the same step of forming the isolation wells 33 and 34. Above the well 37, there is arranged a field oxide layer 38, on which there is arranged a P (39) and $N^+$-alternated doped conductive layer of poly-silicon (i.e., polycrystalline silicon) (40), which forms the chain of P-N junctions of the Zener diodes and is intended to be involved in the current passage. A passivation layer 41 is arranged on the poly-silicon layer 39-40 together with a part of a BPSG layer 42 also extending on the surface regions of the well 37 and layer 24. A first metallization 43 is intended to be connected to the second gate terminal G2 of the further power switch 21, and a second metallization 44 is intended to be connected to a terminal of the high-voltage resistance 15.

It should be observed that the Zener diode chain DZ1-DZN operates under medium voltage, because these diodes are only conductive when the voltage applied exceeds a certain threshold value (such as, 40-50 V) according to the application requirements, and depending on the number of pairs of back-to-back diodes provided, and thus operate at a lower voltage than that to which the resistance 15 is subjected.

Figure 7:
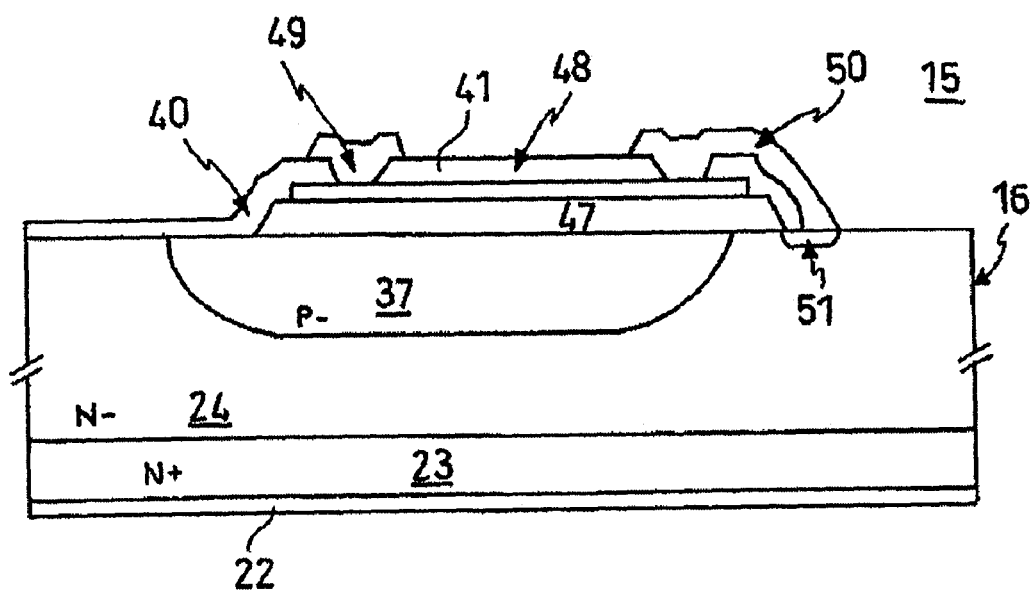
FIG. 7 shows an example of an integrated high-voltage resistor to be employed in said start-up block.

FIG. 7 shows a particular embodiment of the resistor 15 that can be provided, by means of PMOS technology, in the chip 16 and preferably in an edge region thereof, and such as to reduce the bulk of the same. This integrated resistor 15 has a $P^-$-type well 37, on the surface of which there extends a field oxide layer 47 on which there is arranged a layer 48 of doped poly-silicon, such as P-type, which is intended to be involved in the current passage. A first metal contact 49 is in connection with the second metallization 49 of the Zener diodes. A second metal contact 50 is connected to the poly-silicon 48 and an integrated equipotential ring region 51 ($N^+$ doped) extending within the epitaxial layer 24 (and/or 24', when provided) such as to ensure the connection with the first and second drain terminals D1 and D2 of the two PMOS switches 8 and 21. The equipotential ring region 51 loops along the chip 16 periphery, with the main goal of stabilizing the voltage values in that area.

As appears from the above description, the PMOSs 21 and 8, the resistor 15 and diode chain DZ1-DZN can be provided in a parallel manner, because they share many process steps.

It should be noted that the electronic device 2 can be used not only in a SMPS power supply, but also for other applications, such as, for example, those relating to the control of electric motors. The device 2 can be thus connected to other types of load, i.e., loads other than the particular transformer 3 used in the SMPS power supply of the example The teachings of the present invention are particularly advantageous. In fact, the integration of the high-voltage resistance (15) in a same chip (16) in which the high-voltage switch of the start-up circuit is integrated, and the provision of the driving block 9 on a separate chip 17 allows one to provide this driving block 9 with low-voltage technology, while avoiding that the manufacturing process therefor is excessively complicated and expensive. This is due to the fact that the integration of the high-voltage resistance on the same chip of the start-up circuit can take place in a manner completely consistent with the integration process of the start-up circuit alone, and thus without the requirement of providing either expensive additional process steps, or the formation of dedicated layers.

It should be observed that using a low-voltage driving circuit (i.e., typically an integrated controller) allows for state-of-the-art functionalities and the possibility of coping with the technologic development on which the circuit is based, even to technology change.

Furthermore, the cost of the whole device to be housed in an individual package (18) is reduced, because standard technologies are used. Finally, it should be observed that the power device 2 described above does not require, advantageously, using high-voltage components external to the hybrid system housed within the package 18.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A switched-mode electronic power device for the control of a load, comprising:
   a high-voltage integrated switch having an output terminal to be connected to said load;
   integrated and low-voltage driving means for driving the switch;
   a start-up circuit comprising a high-voltage resistor and configured to be enabled, during a step of starting up said power device, to activate the driving means;

wherein:
   the switch and the start-up circuit are integrated in a first semiconductor chip;
   the driving means are integrated in a different second semiconductor material chip;
   the switch is a first MOSFET transistor integrated in a first area of said first semiconductor chip;
   the first semiconductor chip includes a second area in which a second MOSFET transistor of the start-up circuit is integrated, the first and second areas being separated by at least one electrical isolation well;
   said first semiconductor chip includes: a substrate and a drain layer in which body and source wells of said transistors are formed, the transistors including gate structures formed on the first semiconductor chip; and
   the drain layer comprises a lower epitaxial layer and an upper epitaxial layer positioned on the lower epitaxial layer, which are doped with the same sign and with different concentrations.

2. The device according to claim 1, wherein the first and second semiconductor chips are electrically connected to each other by an electrical conductor and are housed in a common enclosure.

3. The device according to claim 1, wherein the first and second chips are fixed to two bases of electrically isolated conductive material and are provided with electrical contact elements for connecting the first and second semiconductor chips to said load and to external electrical circuits.

4. The device according to claim 1, wherein said high-voltage resistor is electrically connected to the driving means and has a resistance value so as to cause a voltage drop capable of preventing damages to the driving means.

5. The device according to claim 1, wherein said switch comprises a high-voltage MOSFET transistor.

6. The device according to claim 5, wherein said MOSFET transistor is an N-channel power transistor.

7. The device according to claim 1, wherein the start-up circuit comprises switched-mode means for adopting a first configuration during the starting-up step and drawing a start electrical signal to be supplied to the driving means and for adopting a second configuration for deactivating the start-up circuit during a working step of said power device.

8. The device according to claim 7, wherein the switched-mode means comprises a high-voltage MOSFET transistor connected to the driving means.

9. The device according to claim 8, wherein the switched-mode means further comprise threshold electrical means for setting a threshold voltage for which said first configuration is adopted.

10. The device according to claim 9, wherein the high-voltage resistor is interposed between said threshold electrical means and a terminal of said high-voltage MOSFET transistor; said MOSFET transistor having a resistance such that the start electrical signal avoids damaging the driving means.

11. The device according to claim 1, wherein the driving means comprise a modulator structured to modulate an input signal and provide a pulse driving signal to the switch.

12. The device according to claim 11, wherein the start-up circuit comprises switched-mode means for adopting a first configuration during the starting-up step and drawing a start electrical signal to be supplied to the driving means and for adopting a second configuration for deactivating the start-up circuit during a working step of said power device and wherein said input signal is the start electrical signal during the starting up step, and is a feedback signal obtained from said load during the working step.

13. The device according to claim 1, wherein said lower and upper epitaxial layers are of N-type.

14. The device according to claim 13, wherein the upper epitaxial layer has a lower doping concentration than the lower epitaxial layer such as to obtain a preset breakdown voltage of said device.

15. The device according to claim 1, wherein said first semiconductor chip comprises a third area in which said high-voltage resistor is integrated; said high-voltage resistor comprising a conductive layer made of doped polysilicon arranged above a layer of silicon dioxide partially extending on a surface of said drain, and partially on a drift well.

16. The device according to claim 15, wherein said third area is arranged in a peripheral region of said first semiconductor chip.

17. An electrical apparatus comprising:
a load; and
a switched-mode electronic power device connected to the load, said switched-mode device including:
a first semiconductor chip that includes a high-voltage integrated switch having an output terminal connected to said load, and a start-up circuit comprising a high-voltage resistor; and
a second semiconductor chip that includes a low-voltage driver circuit structured to drive the switch, the driver circuit being activated by the start-up circuit during a step of starting up said power device, wherein the first switch is a first MOSFET transistor integrated in a first area of said first semiconductor chip, and the first semiconductor chip includes a second area in which a second MOSFET transistor of the start-up circuit is integrated; the first and second areas being separated by at least one electrical isolation well; and wherein said first semiconductor chip comprises a third area in which a high-voltage resistor is integrated; said high-voltage resistor comprising a conductive layer made of doped polysilicon arranged above a layer of silicon dioxide partially extending on a surface of a substrate of said first semiconductor chip.

18. The electrical apparatus according to claim 17, wherein said apparatus is a switched-mode SMPS power supply.

19. The electrical apparatus according to claim 18, wherein said switched-mode power supply comprises an input-output decoupling transformer having a primary winding connected to said switched-mode electronic power device.

20. The electrical apparatus according to claim 19, wherein said power supply further comprises: an input rectifier, and an input filter coupled between the input rectifier and said primary winding.

21. The electrical apparatus according to claim 20, wherein said power supply further comprises:
an output rectifier connected to a secondary winding of the transformer,
an output filter, and
a feedback branch coupled between the output filter and said driver circuit.

22. A switched-mode electronic power device, comprising:
a first semiconductor chip that includes a high-voltage integrated first switch having an output terminal and a start-up circuit; and
a second semiconductor chip that includes low-voltage driver circuit structured to drive the first switch, the driver circuit being activated by the start-up circuit during a step of starting up said power device, wherein the first switch is a first MOSFET transistor integrated in a first area of said first semiconductor chip, and the first semiconductor chip includes a second area in which a second MOSFET transistor of the start-up circuit is integrated; the first and second areas being separated by at least one electrical isolation well; and wherein said first semiconductor chip comprises a third area in which a high-voltage resistor is integrated; said high-voltage resistor comprising a conductive layer made of doped polysilicon arranged above a layer of silicon dioxide partially extending on a surface of a substrate of said first semiconductor chip.

23. The device according to claim 22, wherein the first and second semiconductor chips are electrically connected to each other by an electrical conductor and are housed in a common enclosure.

24. The device according to claim 22, wherein the start-up circuit further includes a threshold device structured to cause the second switch to conduct in response to a voltage across the threshold device exceeding a threshold voltage of the threshold device.

25. A switched-mode electronic power device for the control of a load, comprising:
a high-voltage integrated switch having an output terminal to be connected to said load;
integrated and low-voltage driving means for driving the switch;
a start-up circuit comprising a high-voltage resistor and configured to be enabled, during a step of starting up said power device, to activate the driving means;
wherein:
the switch and the start-up circuit are integrated in a first semiconductor chip;
the driving means are integrated in a different second semiconductor material chip;
the switch is a first MOSFET transistor integrated in a first area of said first semiconductor chip;
the first semiconductor chip includes a second area in which a second MOSFET transistor of the start-up circuit is integrated, the first and second areas being separated by at least one electrical isolation well;
said first semiconductor chip includes: a substrate and a drain layer in which body and source wells of said transistors are formed, the transistors including gate structures formed on the first semiconductor chip; and
said first semiconductor chip comprises a third area in which said high-voltage resistor is integrated; said high-voltage resistor comprising a conductive layer made of doped polysilicon arranged above a layer of silicon dioxide partially extending on a surface of said drain, and partially on a drift well.

26. The device according to claim 25, wherein said third area is arranged in a peripheral region of said first semiconductor chip.

27. A switched-mode power device, comprising:
an input-output decoupling transformer having a primary winding;
a first semiconductor chip that includes a high-voltage integrated first switch having an output terminal and a start-up circuit; and
a second semiconductor chip that includes low-voltage driver circuit structured to drive the first switch, the driver circuit being activated by the start-up circuit during a step of starting up said power device, wherein:
the switch is a first MOSFET transistor integrated in a first area of said first semiconductor chip;

the first semiconductor chip includes a second area in which a second MOSFET transistor of the start-up circuit is integrated, the first and second areas being separated by at least one electrical isolation well;

said first semiconductor chip includes: a substrate and a drain layer in which body and source wells of said transistors are formed, the transistors including gate structures formed on the first semiconductor chip; and the drain layer comprises a lower epitaxial layer and an upper epitaxial layer positioned on the lower epitaxial layer, which are doped with the same sign and with different concentrations.

28. The switched-mode power device according to claim 27, further comprising:
    an input rectifier; and
    an input filter coupled between the input rectifier and said primary winding.

29. The switched-mode power device according to claim 28, further comprising:
    an output rectifier coupled to a second winding of the transformer;
    an output filter coupled to the output rectifier, and
    a feedback branch coupled between the output filter and said driver circuit.

* * * * *